(12) United States Patent
Rho (10) Patent No.: US 7,468,773 B2
(45) Date of Patent: Dec. 23, 2008

(54) LCD PANEL OF LARGE CELL GAP TOLERANCE AND LCD PROJECTOR USING IT

(75) Inventor: Bong-Gyu Rho, Suwon (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 11/030,082

(22) Filed: Jan. 7, 2005

(65) Prior Publication Data

US 2005/0117089 A1 Jun. 2, 2005

(51) Int. Cl.
*G02F 1/1343* (2006.01)

(52) U.S. Cl. .......................... 349/139; 349/95

(58) Field of Classification Search ................. 349/139, 349/95, 142, 143, 144, 57, 42, 43, 114, 141, 349/129, 123, 139.141
See application file for complete search history.

(56) References Cited

U.S. PATENT DOCUMENTS

| | | | | |
|---|---|---|---|---|
| 5,852,479 A | * | 12/1998 | Ueda et al. | 349/9 |
| 6,057,905 A | * | 5/2000 | Nakajima | 349/146 |
| 6,141,077 A | * | 10/2000 | Hirata et al. | 349/143 |
| 6,201,589 B1 | * | 3/2001 | Tombling et al. | 349/141 |
| 6,215,542 B1 | | 4/2001 | Lee et al. | |
| 6,229,589 B1 | * | 5/2001 | Koma | 349/139 |
| 6,466,288 B1 | * | 10/2002 | Rho | 349/141 |
| 6,525,797 B2 | | 2/2003 | Tsuda et al. | |
| 6,833,887 B1 | * | 12/2004 | Kaneko et al. | 349/99 |
| 6,867,838 B2 | * | 3/2005 | Rho | 349/139 |

FOREIGN PATENT DOCUMENTS

KR 2000-73288 12/2000

* cited by examiner

*Primary Examiner*—Thoi V Duong
(74) *Attorney, Agent, or Firm*—Duane Morris LLP

(57) ABSTRACT

A LCD panel having the large cell gap tolerance includes: an LC (Liquid Crystal) having properties changed by input voltage and changing a transmittance rate change of light incident from the outside; electrodes for applying voltage to the LC; base plates on which the electrodes are formed, each base plate having an LC layer located at prescribed intervals to inject the LC between the electrodes; a slit pattern or a floating electrode formed inside each electrode, changing voltage applied to the LC and compensating a cell gap change; and a micro-lens attached on one side of one of the base plates and gathering lights, which are incident from the outside, on a central symmetric line of the slit pattern or the floating electrode. The LCD panel of large cell gap tolerance and the LCD projector using it include LCD panels having large LCD cell gap tolerance.

11 Claims, 10 Drawing Sheets

LCD PANEL OF LARGE CELL GAP TOLERANCE AND LCD PROJECTOR USING IT

RELATED APPLICATIONS

The instant application claims the priority benefit of U.S. application Ser. No. 10/011,784, now U.S. Pat. No. 6,867,838, by the same inventor, the entirety of which is incorporated herein by reference.

BACKGROUND OF THE INVENTION

1. Field of the Invention

The present invention relates to an LCD panel of large cell gap tolerance and an LCD projector using it, and more particularly, to an LCD panel of large cell gap tolerance and an LCD projector using it, in which a brightness change in each gray level and a transmittance rate change due to an alignment error are small by compensating a cell gap change.

2. Background of the Related Art

Recently, an Liquid Crystal Display(LCD) projector is utilized in a large display device for an HDTV or a large display device used for an announcement conference such as a seminar because being small in its volume and easily adjusted in its projection screen size. In general, the LCD projector includes dichroic mirrors for dividing white light output from a light source into red, green and blue colors, LCD panels for modulating the divided lights with the dichroic mirrors and a projection lens for adding and magnifying lights output from the LCD panels.

A conventional LCD panel used in the LCD projector includes an Liquid Crystal(LC) of which properties are changed according to input voltage, pixel electrodes and a common electrode for applying voltage to the LC, and base plates on which the electrodes are formed. Furthermore, the base plates, on which the pixel electrodes are formed, further include TFTs(Thin Film Transistors) for applying/blocking voltage to/from LC layers every pixel. Here, the TFT is most used in the LCD panel of the LCD projector as being easy in multi-gray and fast response.

However, such LCD panel shows different properties according to its thickness. That is, according to the LCD panel thickness, a cell transmittance rate is changed small in high gray level but large in low gray level. Additionally, the LCD panel brightness is gradually lowered because an aperture ratio is lowered when the resolution of the LCD panel becomes gradually high.

Even though the highly controlled LCD fabrication Process, the LCD thickness is changed according to position even in the same LCD panel. Furthermore, the LCD panel thickness has different thermal expansion according to the position (or point) because the LCD panel receives lots of infrared rays and visible rays from the light source, and thereby the LCD panel thickness is changed according to the position (or point). For example, if there is a difference of temperature of 1° C. between glass base plates of the LCD panel, the cell gap is changed about 0.1 µm.

Figure 1:
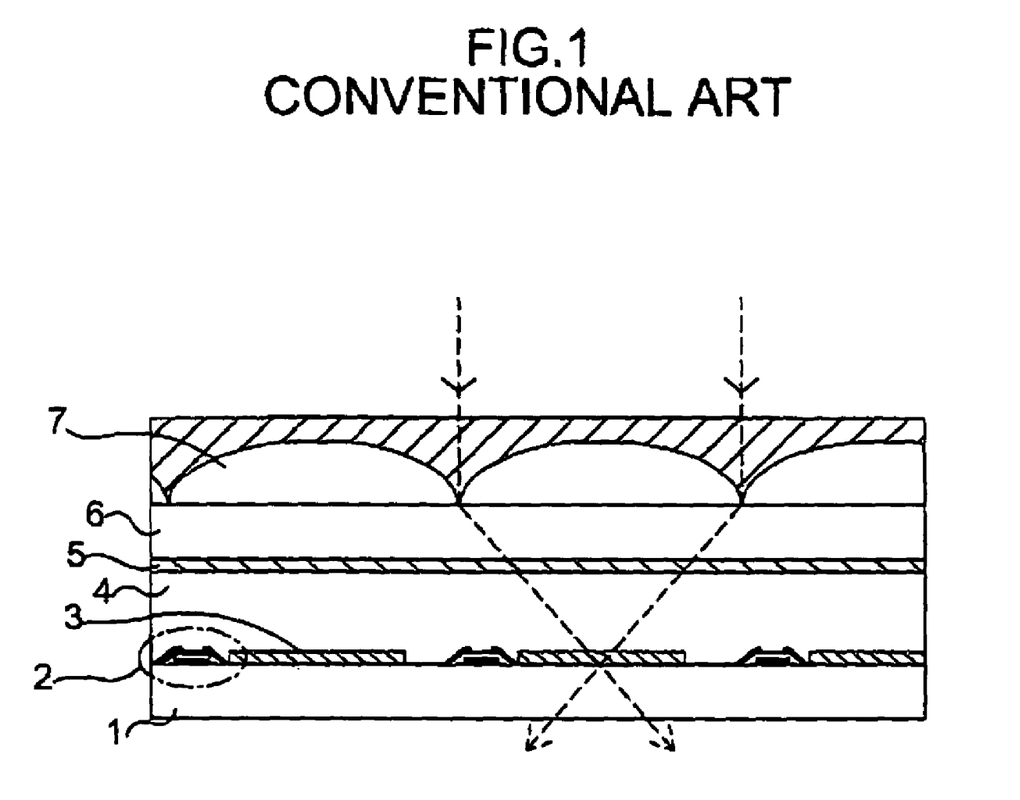
FIG. 1 illustrates a sectional view of a conventional LCD panel on which a micro-lens is attached.

FIG. 1 illustrates a sectional view of an LCD panel on which a conventional micro-lens is attached.

As shown in FIG. 1, the LCD panel, on which the micro-lens is attached, includes a first glass base plate 1, TFTs 2 and pixel electrodes 3 formed on the first glass base plate 1, a second glass base plate 6 formed in a prescribed interval from the first glass base plate 1, a common electrode 5 directing the TFTs 2 and the pixel electrodes 3 and formed on the second glass base plate 6, an LC layer 4 filled with LC and formed between the pixel electrodes and the common electrode 5, and a micro-lens 7 attached on an opposite side of the side the second glass base plate 6, on which the common electrode 5 is attached.

The micro-lens 7 sends light entering a BM(Black Matrix), a signal line or a scan line (non-modulated areas) toward the pixel electrodes and increase effective aperture ratio.

Figure 2:
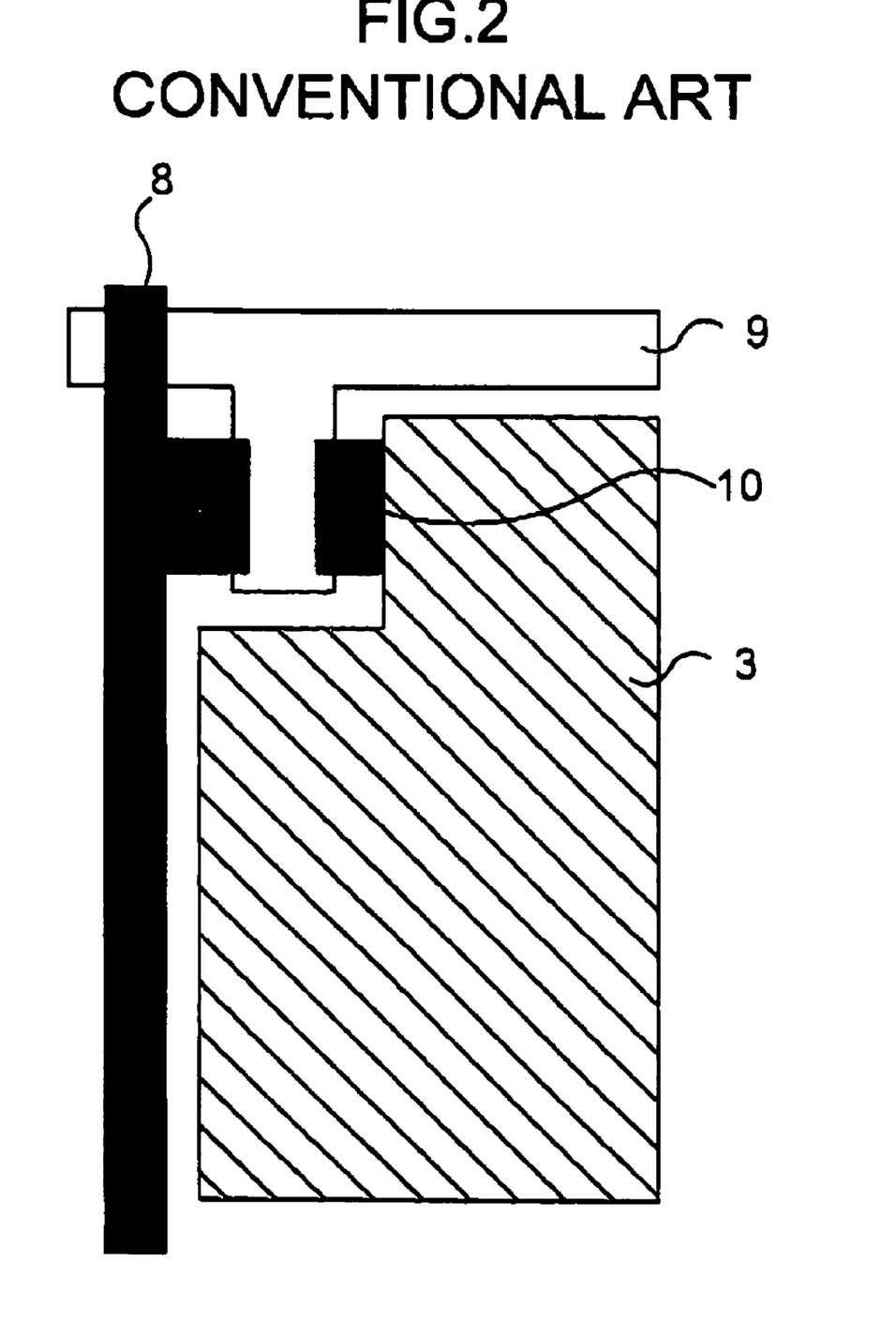
FIG. 2 illustrates a detailed sectional view of a pixel electrode of FIG. 1.

FIG. 2 illustrates a detailed sectional view of the pixel electrode of FIG. 1. A gate electrode 9 of the TFT 2 is connected to the scan line of the LCD panel, a source electrode 8 is connected to the signal line of the LCD panel, and a drain electrode 10 is connected to the pixel electrode 5 of the LCD panel.

An operation method of the LCD panel on which the micro-lens is attached will be described as follows.

In case of a selection period of time:

If voltage of the gate electrode 9 connected to the scan line is larger than that of the source electrode 8 connected to the signal line, a connection resistance of a channel formed between the drain electrode 10 and the source electrode 8 becomes small. Therefore, voltage of the source electrode 8 connected to the signal line is formed between the pixel electrode 3 and the LC layer 4.

In case of a non-selection period of time:

If voltage of the gate electrode 9 connected to the scan line is smaller than that of the source electrode 8 connected to the signal line, the connection resistance of a channel formed between the drain electrode 10 and the source electrode 8 becomes larger, and thereby the drain electrode 10 and the source electrode 8 are electrically isolated. Therefore, the LC layer 4 keeps electric charge accumulated during the selection period of time.

If root means square(rms) voltage, which is applied to the LC layer 4 formed between the pixel electrode 3 and the common electrode 5, is controlled when linearly polarized light emitted from a polarizer (not shown) mounted on the outside of the micro-lens 7 passes the LC layer 4 through the micro-lens 7, the polarized state of the light is changed. The LCD pixel brightness is changed by the changed light selectively passing an analyzer mounted to the outside of the first glass base plate 1 of the LCD panel, and thereby the pixel brightness change as data information.

Meanwhile, the LCD projector according to the prior arts, according to LC mode, uses a 90° TN mode in case of a transmission type, a parallel oriented ECB(Electric Controlled Birefringence) mode in case of a reflection type, or a TN mode having a twist angle less than 90°.

Recently, the LCD panel used in the LCD projector shows resolution of 0.7 inch XGA level and may show resolution of 0.5 inch XGA level in the future.

However, the conventional LCD, on which the micro-lens is attached, and the LCD projector using it has still several problems that the brightness change in each gray level is large and the transmittance rate change due to alignment error is large, and thereby the video quality is deteriorated and the production yield is low. The problems will be described in more detail, taking examples as follows.

Figure 3:
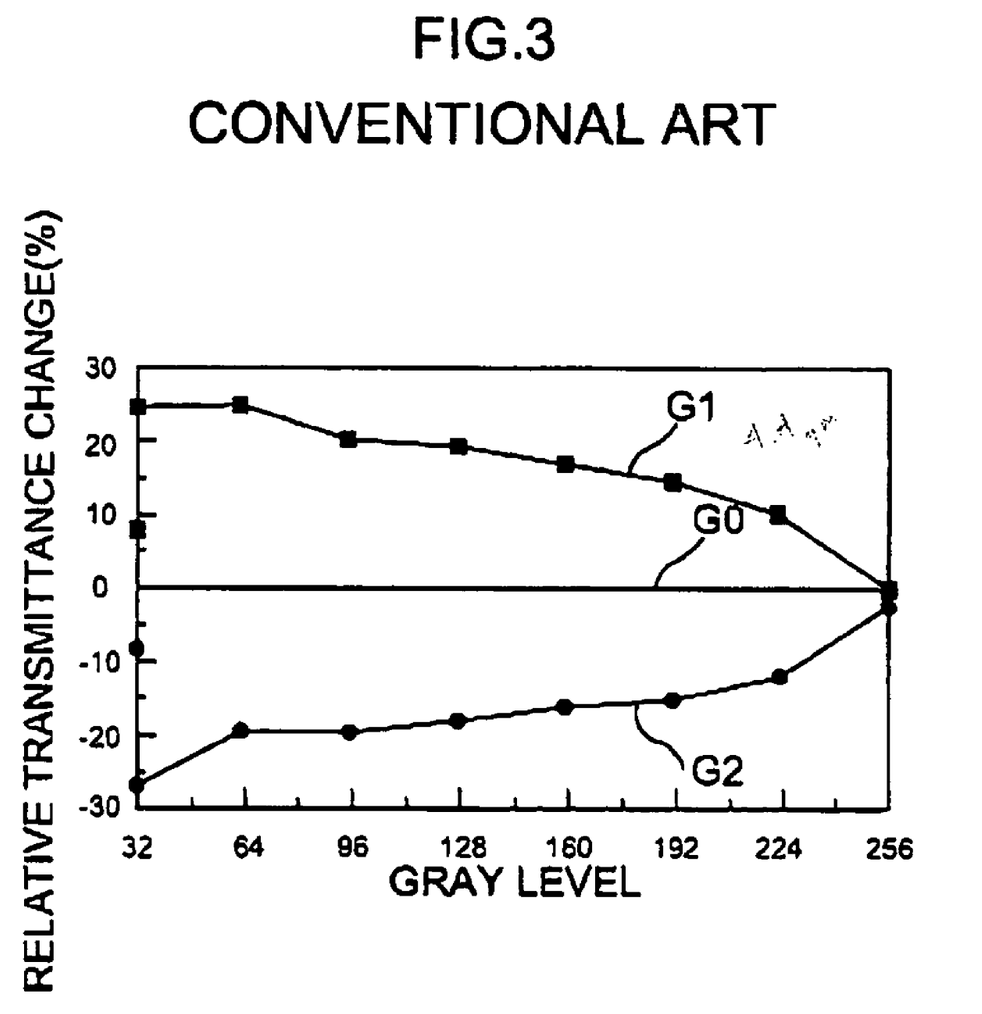
FIG. 3 illustrates a graph showing a relative transmittance change in each gray level of the LCD panel according to the cell gap.

FIG. 3 illustrates a graph showing a relative transmittance change in each gray level of the LCD panel according to the cell gap of the prior art.

As shown in FIG. 3, G0 indicates the reference, so the transmittance change is zero when the thickness is 4.0 µm, G1 indicates the relative transmittance change when the cell gap is 4.4 µm, and G2 indicates the relative transmittance change when the cell gap is 3.6 µm. Therefore, because the cell relative transmittance change differs about 40% or more according to the cell gap, the brightness change in each gray level is still large.

Therefore, even though the conventional LCD panel, on which the micro-lens is attached, places the focus on the pixel electrode, the brightness change in each gray level is large and the transmittance rate change due to the alignment error is large, thereby deteriorating the video quality and lowering the production yield.

Meanwhile, the LCD projector using the conventional LCD panel, on which the micro-lens is attached, also has the above problems that the brightness change in each gray level is large, the transmittance rate change due to the alignment error is large, thereby deteriorating the video quality and lowering the production yield.

SUMMARY OF THE INVENTION

Accordingly, the present invention is directed to an LCD panel of large cell gap tolerance and an LCD projector using it that substantially obviates one or more problems due to limitations and disadvantages of the related art.

An object of the present invention is to provide an LCD panel of large cell gap tolerance and an LCD projector using it, which can minimize a transmittance rate change in each gray level by compensating the thickness of the LCD panel, to improve the video quality and the production yield.

Another object of the present invention is to provide an LCD panel of large cell gap tolerance and an LCD projector using it, which can minimize a transmittance rate change due to brightness and alignment errors in each gray level by compensating the thickness of the LCD panel, to improve the video quality and the production yield.

A further object of the present invention is to provide an LCD panel of large cell gap tolerance and an LCD projector using it, which minimize a transmittance rate change due to brightness and alignment errors in each gray level by placing focus of a micro-lens on a central symmetric line of a slit pattern or a floating electrode and compensating the thickness of the LCD panel, to increase the video quality and the production yield.

A still further object of the present invention is to provide an LCD panel of large cell gap tolerance and an LCD projector using it, which can minimize a transmittance rate change due to a cell gap change and an alignment error using a side electric field property according to the cell gap change.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD(Liquid Crystal Display) panel having large cell gap tolerance includes: an LC(Liquid Crystal) having properties changed by input voltage, the LC changing a transmittance rate change of light incident from the outside; electrodes for applying voltage to the LC; base plates on which the electrodes are formed, each base plate having an LC layer located at prescribed intervals to inject the LC between the electrodes; a slit pattern or a floating electrode formed inside each electrode, changing voltage applied to the LC and compensating a cell gap change; and a micro-lens attached on one side of one of the base plates, the micro-lens gathering lights, which are incident from the outside, on a central symmetric line of the slit pattern or the floating electrode.

In another aspect of the present invention, to achieve these objects and other advantages and in accordance with the purpose of the invention, an LCD projector includes: dichromatic filters for dividing light output form a light source into red, green and blue colors; LCD panels for modulating the lights by minimizing a transmittance rate change of the lights output from the dichromatic filters by compensating a value that multiplies a anisotropic refractive index($\Delta$ n) of LC and d(cell gap) in relation to a cell gap deviation in a gray level condition; and a projection lens for gathering and magnifying the lights output from the LCD panels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 4:
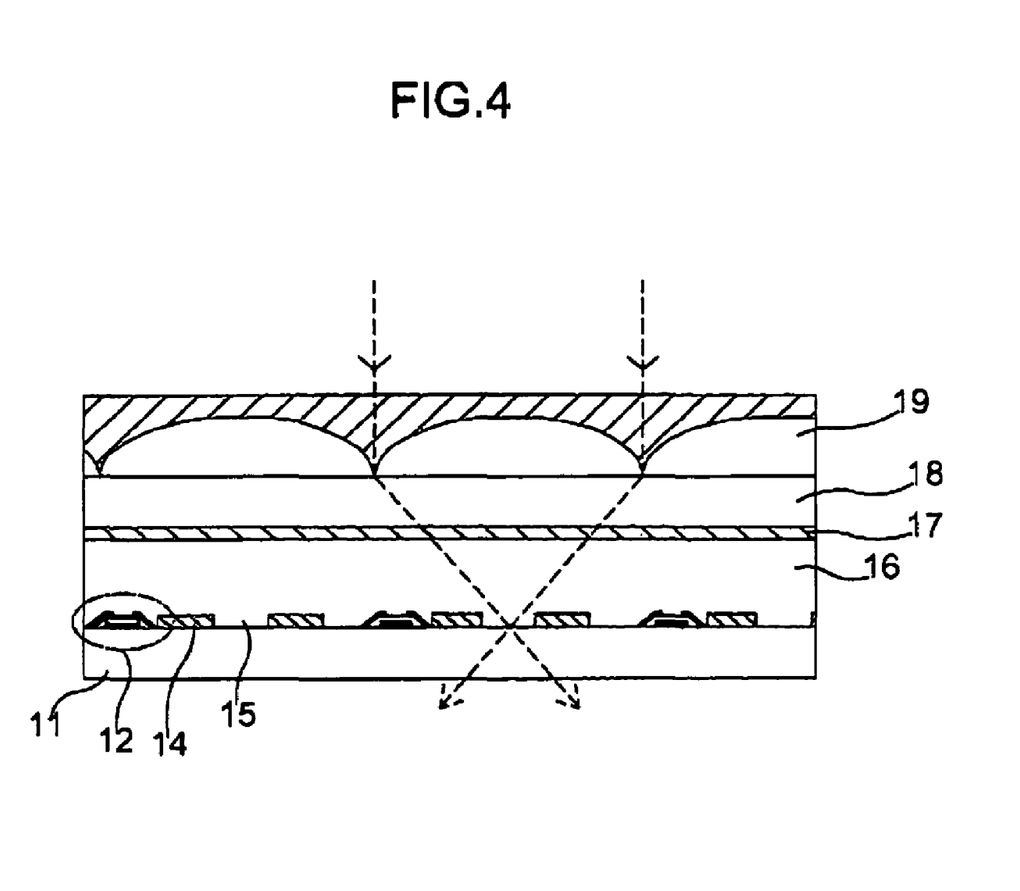
FIG. 4 illustrates a sectional view of an LCD panel, on which a micro-lens is attached, according to a first preferred embodiment of the present invention.

FIG. 4 illustrates a sectional view of an LCD panel, on which a micro-lens is attached, according to a first preferred embodiment of the present invention.

As shown in FIG. 4, the LCD(Liquid Crystal Display) panel, on which the micro-lens is attached, includes a first glass base plate 11, TFTs 12, pixel electrodes 14 and slit patterns 15 formed on the first glass base plate 11, a second glass base plate 18 formed in a prescribed interval from the first glass base plate 1, a common electrode 17 directing the TFTs 12 and the pixel electrodes 14 and formed on the second glass base plate 18, an LC(Liquid Crystal) layer 16 filled with LC and formed between the pixel electrodes 14 and the common electrode 17, and the micro-lens 19 attached on an opposite side of the side of the second glass base plate 18, on which the common electrode 17 is attached.

Figure 5:
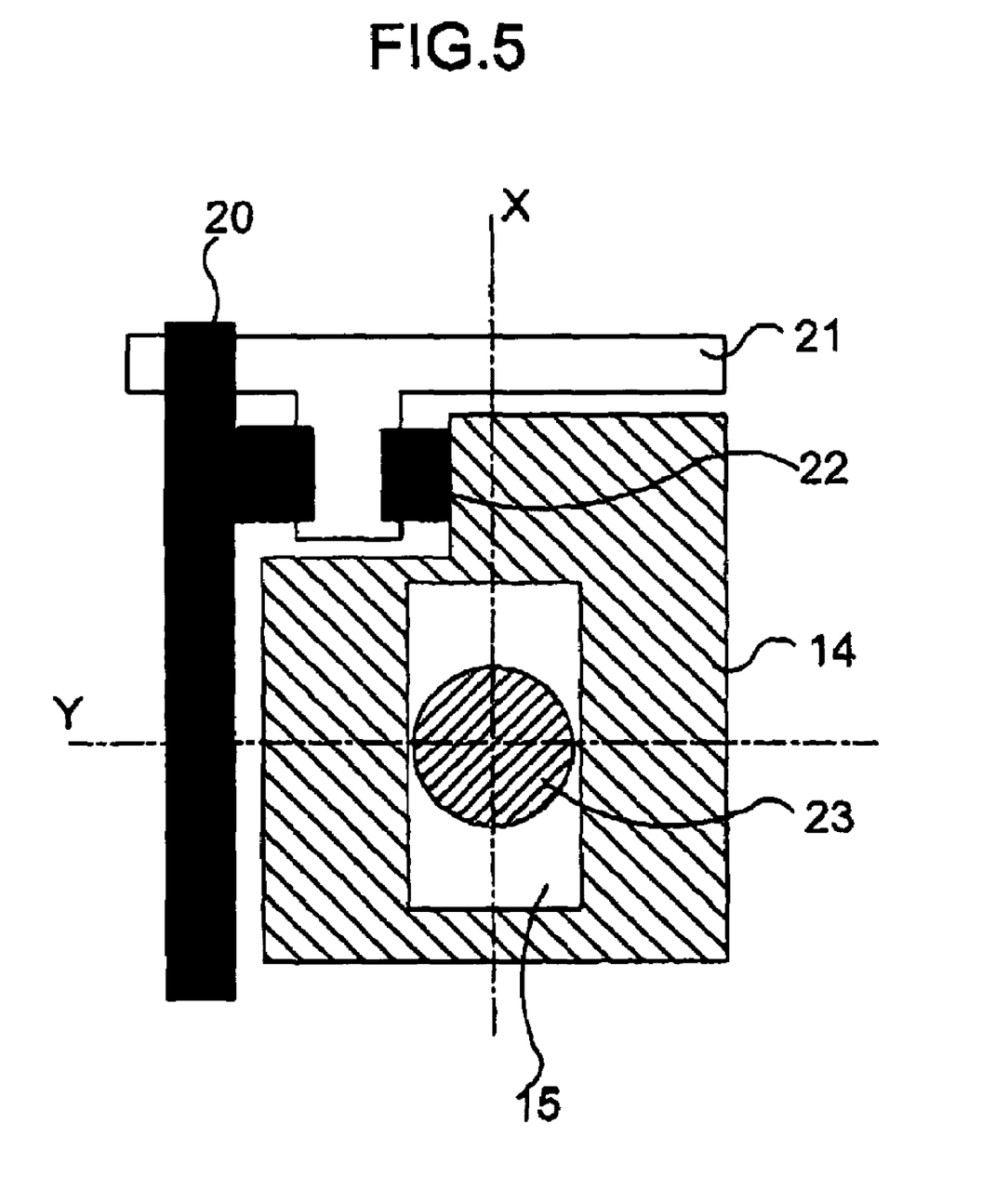
FIG. 5 illustrates a detailed sectional view of a pixel electrode of FIG. 4.

FIG. 5 illustrates a detailed sectional view of the pixel electrode of FIG. 4.

A gate electrode 21 of the TFT 12 is connected to a scan line of the LCD panel, a source electrode 20 is connected to a signal line of the LCD panel, and a drain electrode 22 is connected to the pixel electrode 14 of the LCD panel. Furthermore, the slit pattern formed in the pixel electrode 14 is designed in such a manner that a sectional center of a light point passing the micro-lens 19 is located at the center of the slit pattern 15, i.e., a point where an X-axis symmetric line and a Y-axis symmetric line of the slit pattern meet with each other. Here, a central symmetric line of the slit pattern is a symmetric line, which divides the slit pattern into two in a longitudinal direction.

An operation method of the LCD panel according to the present invention will be described as follows.

First, referring to the drawings, when voltage is applied to the LC layer, the relationship between an electric field induced to the silt pattern 15 and a voltage distribution will be described as follows.

Figure 6:
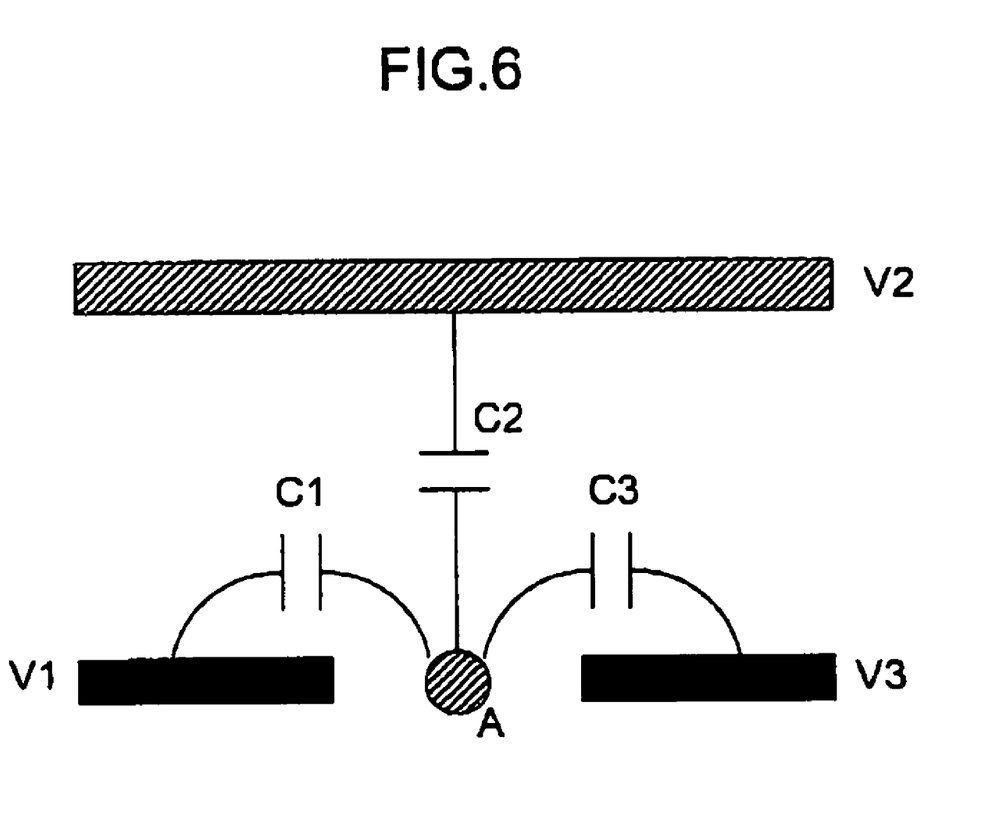
FIG. 6 illustrates a view showing a structure of an equivalent circuit of a slit pattern of FIG. 4.

FIG. 6 illustrates a view showing a structure of an equivalent circuit of the slit pattern of FIG. 4.

As shown in FIG. 6, V1 and V3 indicate voltage formed on the pixel electrodes, and V2 indicates voltage formed on the common electrode. At this time, assuming that there is a microelectrode at an A point in the slit pattern, C1, C2 and C3 indicate capacitances formed among the pixel electrodes, the common electrode and the microelectrode.

Therefore, induction voltage(V(A)) induced to the microelectrode(A) of the slit pattern is obtained through the following equation(1):

$$V(A) = \frac{C1 \cdot V1 + C2 \cdot V2 + C3 \cdot V3 + \ldots}{C1 + C2 + C3 + \ldots} \quad (1)$$

In the relationship between the voltage distribution(V1, V3; V1=V3) induced to the microelectrode of the A part and the voltage distribution of the pixel electrodes, if the voltage distribution(V1, V3; V1=V3) induced to the microelectrode of the A part is different from the voltage distribution of the pixel electrodes, the horizontal electric field of voltage corresponding to a difference between the voltage distribution (V1, V3; V1=V3) induced to the microelectrode of the A part and the voltage distribution of the pixel electrodes is applied between the microelectrode of the A art and the pixel electrode.

In the relationship between the cell gap change and the induction voltage distribution, the V(A) moves toward the voltage distribution of the common electrode because the capacitance(C2) between the microelectrode and the common electrode is increased if the cell gap is reduced, and the V(A) moves toward the voltage distribution of the pixel electrode because the capacitance(C2) is lowered if the cell gap is increased. That is, if dielectic anisotropic($\Delta \in$) of LC is positive and a lateral electric field and a vertical electric field are applied at the same time, liquid molecules increase a strength oriented horizontally if the lateral electric field becomes strong, but increase a strength oriented vertically if the lateral electric field becomes weak.

In the relationship between the cell gap change and LC anisotropic refractive index($\Delta$ n), LC anisotropic refractive index($\Delta$ n) is increased because the horizontal electric field is increased if the cell gap(d) is reduced, but reduced because the vertical electric field is increased if the cell gap is increased.

Therefore, the cell transmittance is proportional to a value that multiplies anisotropic refractive index($\Delta$ n) of LC and the cell gap(d). If one of anisotropic refractive index($\Delta$ n) of LC and the cell gap(d) is increased, the other is reduced because anisotropic refractive index($\Delta$ n) of LC and the cell gap(d) are acted in opposite directions to each other. Therefore, the transmittance rate change of the LCD panel according to the cell gap change is reduced because the value that multiplies anisotropic refractive index($\Delta$ n) of LC and the cell gap(d) is changed small.

Figure 7:
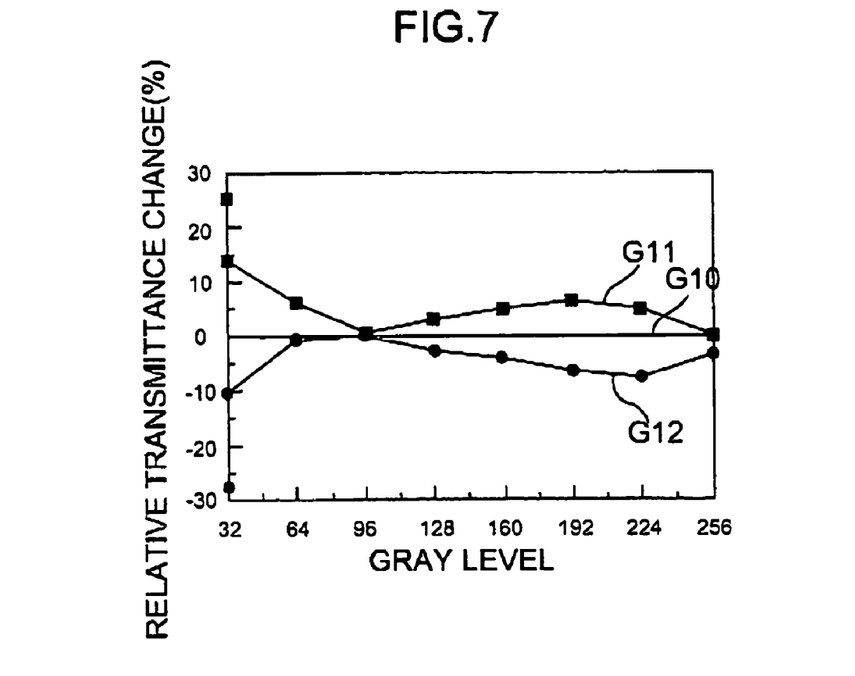
FIG. 7 illustrates a graph showing a relative transmittance change in each gray level according to the cell gap of the LCD panel, on which the micro-lens is attached, of the present invention.

FIG. 7 illustrates a graph showing a relative transmittance change in each gray level according to the cell gap of the LCD panel, on which the micro-lens is attached, of the present invention. G10 is a graph showing the transmittance rate change in case that a reference cell gap is 4.0 μm, G11 is a graph showing the transmittance rate change in case that the cell gap is 4.4 μm, and G12 is a graph showing the transmittance rate change in case that the cell gap is 3.6 μm.

The following table 1 shows the maximum transmittance rate when the cell gap is changed +/−10% in case that a diameter of light point gathered on a symmetric central line of the slit pattern through the micro-lens is 4 μm like the width of the slit pattern, and the width of the pixel electrode is 4 μm.

TABLE 1

| | Gray level | | | | | | | |
|---|---|---|---|---|---|---|---|---|
| | 32 | 64 | 96 | 128 | 160 | 192 | 224 | 256 |
| Maximum Brightness change(%) | 16.4 | 4.2 | 8.2 | 14.1 | 15.5 | 17.8 | 15.4 | 3.1 |

As shown in the drawing, the width of the transmittance rate change according to the cell gap deviation of the LCD panel, on which the micro-lens is attached, of the present invention is narrower in each gray level than that of the conventional LCD panel of FIG. 3. That is, the LCD panel, on which the micro-lens is attached, according to the present invention is reduced in the alignment error and minimized in the light transmittance rate change.

Figure 8:
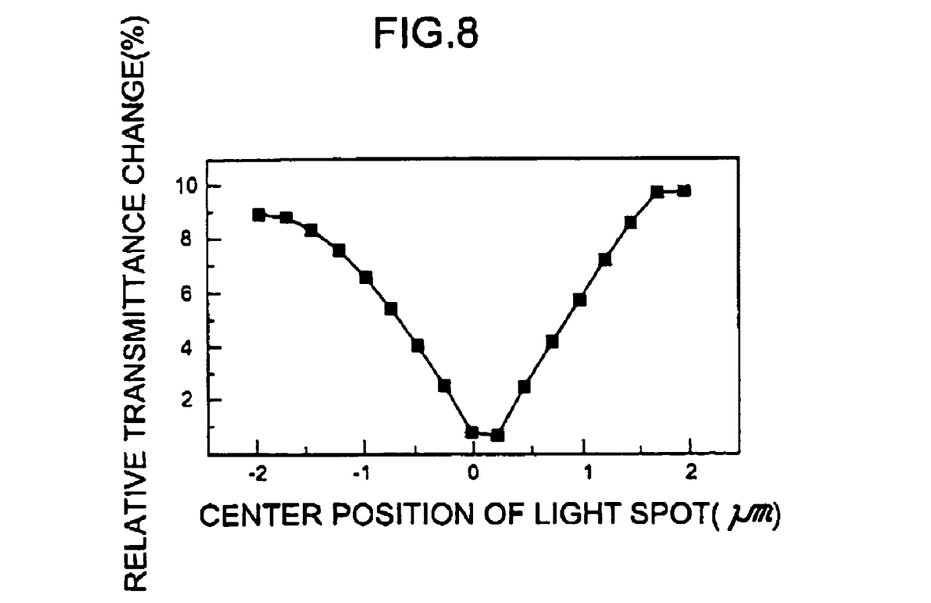
FIG. 8 illustrates a view showing a relative transmittance change due to alignment error of the micro-lens.

FIG. 8 illustrates a view showing a relative transmittance change due to alignment error of the micro-lens in a gray level 96 of FIG. 7. The graph shows the relative transmittance rate that the transmittance rate within the range of light point radius of 2 μm is integrated every point of 0.25 μm from the central symmetric line of the slit pattern.

For example, assuming that at a point x away from the central symmetric line and an integrated value of the transmittance rate of the light point radius of 2 μm from x is l(x), the integrated value of the transmittance rate of radius of 2 μm from the point 1 μm away from the x is l(x+1), and thereby the relative transmittance rate(R(x)) is obtained by the following equation (2).

$$R(x) = \frac{I(x+1)}{I(x)} \times 100 \qquad (2)$$

Therefore, the relative transmittance rate change due to the alignment error is smallest when light passing the micro-lens is incident on the central symmetric line of the slit pattern. That is, because an effect of the slit pattern is not shown when the light passing the micro-lens is separated from the slit pattern, the micro-lens is designed in such a manner that the micro-lens places the focus on the central symmetric line of the slit pattern.

Meanwhile, the slit pattern is designed in such a manner that the width of the slit pattern is smaller than the cell gap because the operation voltage is increased and the light and dark contrast ratio is lowered if the width is increased. For example, if the cell gap is about 4 μm, the operation voltage is lowered and the light and dark contrast ratio is increased only when the width of the slit pattern is 4 μm. Therefore, to make the light, which passed the micro-lens, satisfy the above conditions and pass the slit pattern, the light must be located within 2 μm from the central symmetric line.

Figure 9:
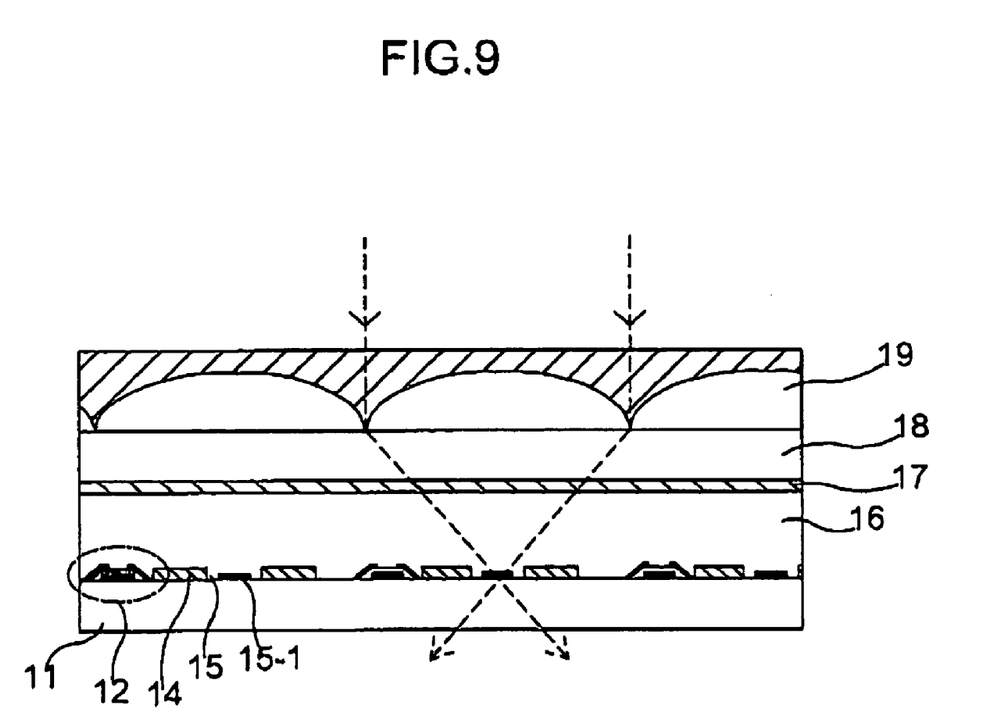
FIG. 9 illustrates a sectional view of an LCD panel using a micro-lens according to a second preferred embodiment of the present invention.

FIG. 9 illustrates a sectional view of an LCD panel using a micro-lens according to a second preferred embodiment of the present invention.

As shown in FIG. 9, the LCD panel, on which the micro-lens is attached, includes a first glass base plate 11, TFTs 12 and pixel electrodes 14 formed on the first glass base plate 11, floating electrodes 15-1 formed inside the pixel electrodes 14, a second glass base plate 18 formed in a prescribed interval from the first glass base plate 11, a common electrode 17 directing the TFTs 12 and the pixel electrodes 14 and formed on the second glass base plate 18, an LC layer 16 filled with LC and formed between the pixel electrode 14 and the common electrode 17, and a micro-lens 19 attached on an opposite side of the side of the second glass base plate 18, on which the common electrode 17 is attached.

Figure 10:
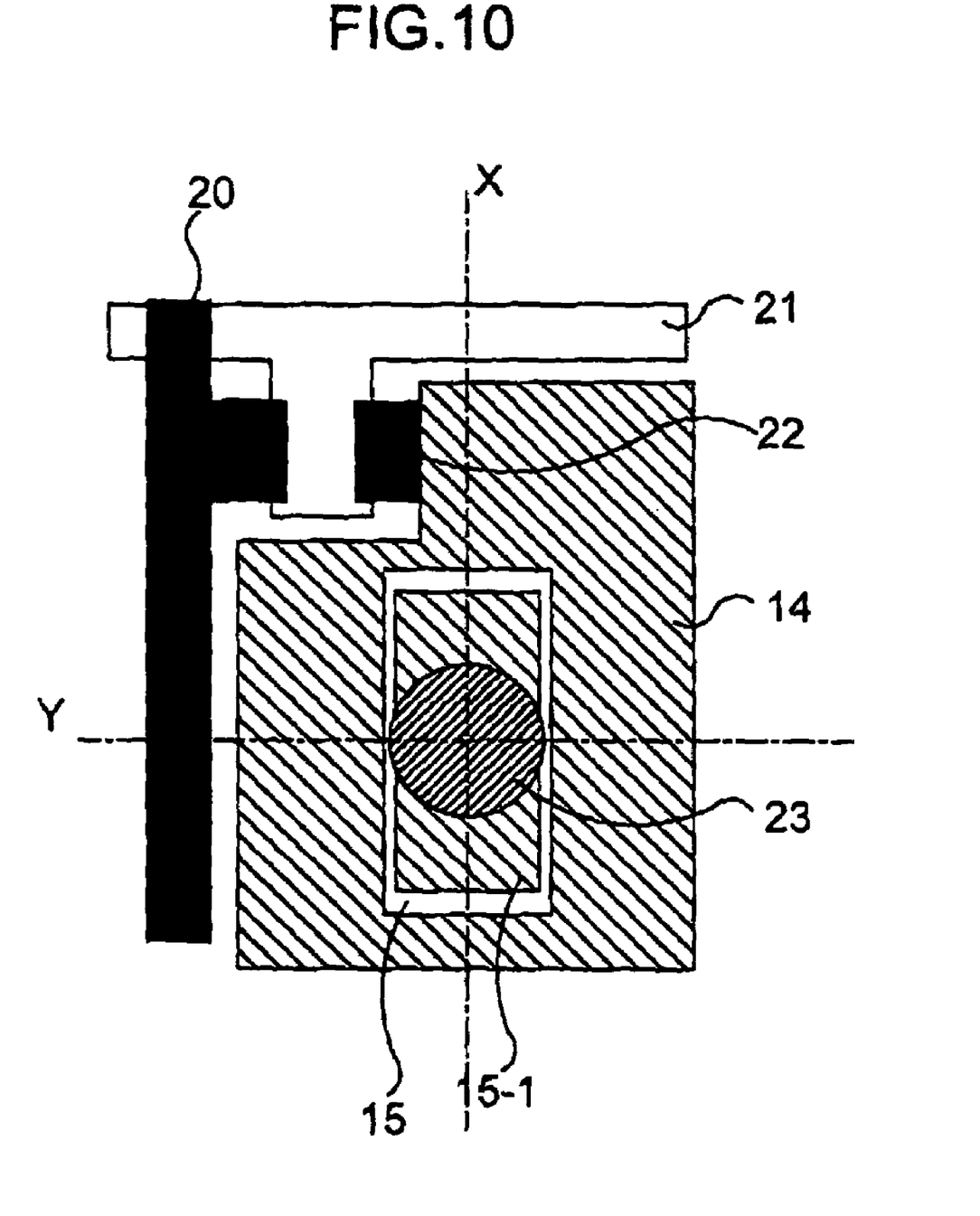
FIG. 10 illustrates a detailed sectional view of a pixel electrode including a floating electrode of FIG. 9.

FIG. 10 illustrates a detailed sectional view of the pixel electrode including the floating electrode of FIG. 9.

A gate electrode 21 of the TFT 12 is connected to a scan line of the LCD panel, a source electrode 20 is connected to a signal line of the LCD panel, and a drain electrode 22 is connected to the pixel electrode 14 of the LCD panel. Furthermore, the floating electrode 15-1 formed in the pixel electrode 14 is designed in such a manner that a sectional center of a light point passing the micro-lens 19 is located at the center of the floating electrode 15-1, i.e., a point where an X-axis symmetric line and a Y-axis symmetric line of the floating electrode meet with each other. If the floating electrode is designed to satisfy the above conditions, the transmittance rate change due to the alignment error is minimized like the slit pattern of the first embodiment.

Meanwhile, because of the structure of the pixel electrode and the micro-lens, if the focus of the micro-lens is not placed on the point where the symmetric lines of the X-axis and the Y-axis meet with each other, the focus is placed on one point of the central symmetric line.

In the LCD panel, in which the floating electrode is formed inside the pixel electrode, voltage induced to the floating electrode is induced like the above equation 1 relative to the LCD panel, on which the slit pattern is formed, of the first embodiment. That is, because the floating electrode serves as the microelectrode(A) of the slit pattern of the first embodiment, the capacitance formed between the surrounding electrodes is equal to that formed between the microelectrode and the surrounding electrodes in an equivalent circuit.

Therefore, in case that there is the floating electrode, because voltage induced to the floating electrode is moved toward voltage of the common electrode if the cell gap is reduced, the horizontal electric field is increased, and thereby the cell refraction anisotropy is increased. To the contrary, because voltage induced to the floating electrode is moved toward voltage of the pixel electrode if the cell gap is increased, anisotropic refractive index(Δ n) of LC is reduced.

The cell brightness is a function of a value that multiplies anisotropic refractive index(Δ n) of LC and the cell gap(d). Here, because the cell refraction anisotropy(Δ n) and the cell gap(d) act in opposite directions to each other, the LCD panel including the floating electrodes formed on the pixel electrodes operates like the LCD panel having the slit pattern of the first embodiment. That is, the transmittance rate of the LCD panel including the floating electrodes is insensible to the cell gap change.

Therefore, the LCD panel, on which the micro-lens is attached, according to the present invention can reduce the alignment error generated when the micro-lens is attached. Furthermore, the LCD panel according to the present invention can minimize the transmittance rate change by designing in such a manner that the focus of the micro-lens is placed on the symmetric point of the slit pattern or the floating electrode. Thereby, the LCD panel can have improved color uniformity, color purity and color reproducibility.

Till now, the LCD panel according to the present invention is described in relation to the embodiments having the slit pattern and the floating electrode formed on the first glass base plate, but the slit pattern and the floating electrode may be formed on the common electrode. At this time, in case that the slit patterns or the floating electrodes are formed in the pixel electrodes, they are simultaneously formed when the pixel electrodes are formed. However, in case that the slit patterns or the floating electrodes are formed on the common electrode, a step of exposing the common electrode is added.

The LCD panel constructed as the above may be utilized as an LCD element of an LCD projector requiring high brightness and quality like conference data or HDTVs.

Figure 11:
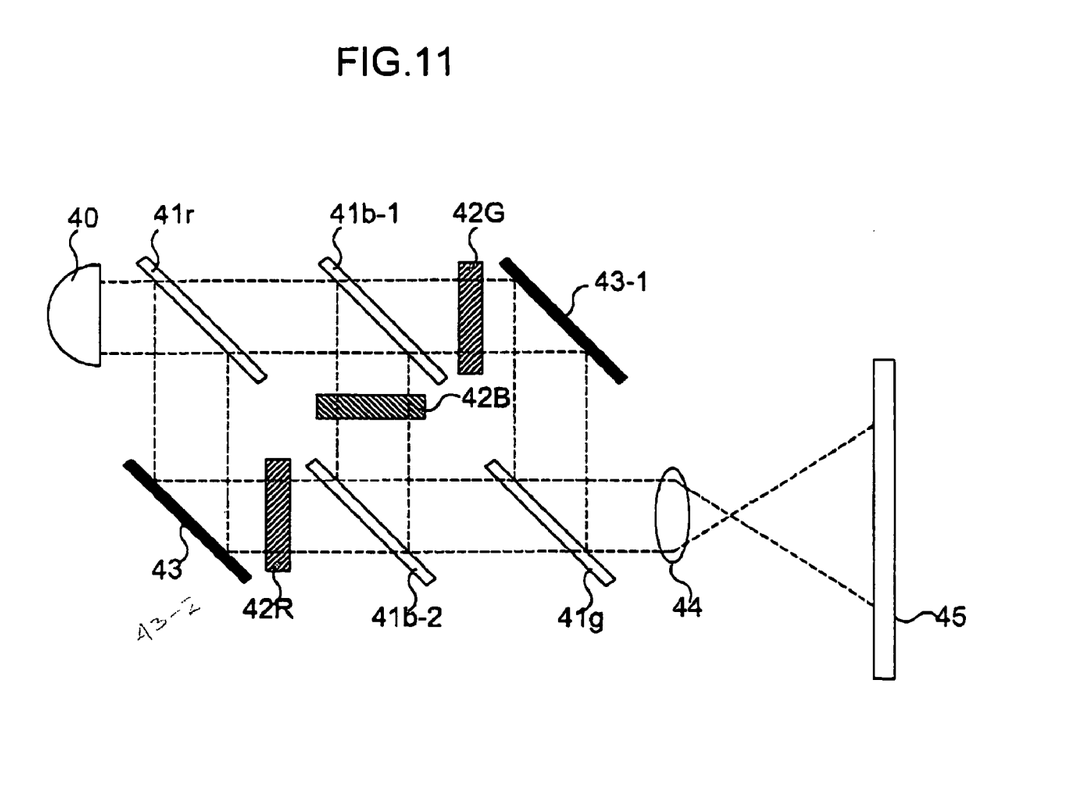
FIG. 11 illustrates a view showing a structure of an LCD projector of the present invention.

FIG. 11 illustrates a view showing a structure of the LCD projector of the present invention. The LCD projector includes a light source 40 generating and outputting white light, diachromatic filters or diachromatic mirrors 41r, 41b-1, 41b-2 and 41g receiving white light and dividing white light into red, green and blue colors, LCD panels 42R, 42G and 42B for modulating(i.e., controlling the transmittance rate) and outputting the red, green and blue color lights, refraction mirrors 43-1 and 43-2 for regulating a progress path of the lights, and a projection lens 44 receiving and magnifying the lights passing the LCD panels 42R, 42G and 42B and outputting the magnified lights to a screen 45.

Here, as described above, the LCD panels 42R, 42G and 42B place the focus of the micro-lens on the center of the slit patterns or the floating electrodes formed on the pixel electrodes.

Therefore, the LCD projector according to the present invention can have excellent color uniformity, color purity and color reproducibility displayed on the screen.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A liquid crystal display (LCD) panel comprising:
    a first glass base plate, on which thin film transistors (TFTs) and pixel electrodes are formed, each of said pixel electrodes connected to a TFT;
    a second glass base plate apart from the first glass base plate with a predetermined distance, on which a common electrode is formed;
    a liquid crystal (LC) filled between the first glass base plate and the second glass base plate;
    a hole formed in each pixel electrode with a predetermined width, the predetermined width being less than said predetermined distance; and
    a floating electrode inside the hole.

2. The LCD panel according to claim 1, wherein the LC is nematic liquid crystal material in which dielectric anisotropic ($\Delta \in$) of LC is positive, such that the LC changes a transmittance rate change of light incident from outside by input voltage.

3. The LCD panel according to claim 1, wherein the hole is etched in the pixel electrodes to be a rectangular form.

4. The LCD panel according to claim 1, further comprising:
    a micro-lens attached on the second glass base plate, the micro-lens being positioned opposite of the common electrode and gathering light incident from the outside.

5. The LCD panel according to claim 4, wherein the focus of the micro-lens is placed on the center of the hole.

6. The LCD panel according to claim 4, wherein the micro-lens is in the form of a hexagon.

7. The LCD panel according to claim 4, wherein the focus of micro-lens is placed on the center of the floating electrode.

8. A liquid crystal display (LCD) panel comprising:
    a first glass base plate, on which thin film transistors (TFTs) and pixel electrodes are formed, each of said pixel electrodes connected to a TFT;
    a second glass base plate apart from the first glass base plate with a predetermined distance, on which a common electrode is formed;
    a liquid crystal (LC) filled between the first glass base plate and the second glass base plate;
    a hole formed in each pixel electrode, the hole having a width smaller than said predetermined distance; and
    a floating electrode inside the hole.

9. The LCD panel of claim 8, wherein the LC is nematic liquid crystal material in which dielectric anisotropic ($\Delta \in$) of LC is positive, such that the LC changes a transmittance rate change of light incident from outside by input voltage.

10. The LCD panel of claim 8 further comprising a micro-lens attached on the second glass base plate, the micro-lens being positioned opposite of the common electrode and gathering light incident from the outside.

11. The LCD panel of claim 10, wherein the focus of micro-lens is placed on the center of the floating electrode.

* * * * *